United States Patent [19]

Pandorf et al.

[11] Patent Number: 5,625,152
[45] Date of Patent: Apr. 29, 1997

[54] HEATED PRESSURE TRANSDUCER ASSEMBLY

[75] Inventors: Robert C. Pandorf, Newton Highlands; Archibald J. DeMone, Westford; Frank W. Thomas, Lunenberg; Steven D. Blankenship, Melrose, all of Mass.

[73] Assignee: MKS Instruments, Inc., Andover, Mass.

[21] Appl. No.: 585,535

[22] Filed: Jan. 16, 1996

[51] Int. Cl.⁶ .................................. G01L 7/00; G01L 9/12
[52] U.S. Cl. .................................. 73/756; 73/724
[58] Field of Search .......................... 73/756, 724, 700, 73/753, 715, 723–728

[56] References Cited

U.S. PATENT DOCUMENTS

| | | | |
|---|---|---|---|
| 4,084,439 | 4/1978 | Teter et al. | 73/718 |
| 4,176,557 | 12/1979 | Johnston | 73/708 |
| 4,738,276 | 4/1988 | Adams | 73/756 X |
| 5,271,277 | 12/1993 | Pandorf. | |

*Primary Examiner*—Richard Chilcot
*Assistant Examiner*—Joseph L. Felber
*Attorney, Agent, or Firm*—Lappin & Kusmer LLP

[57] ABSTRACT

The disclosed heated pressure transducer includes an external enclosure, a first thermal shell housed within the external enclosure, and a sensor housed within the first thermal shell. The transducer further includes a heater for heating the first thermal shell and a control unit for controlling the heater. A tube couples the sensor to a source of heated, pressurized gas and the transducer may further include a tube-heater that is controlled by the control unit for applying heat to the tube. The transducer may also include a second thermal shell housed within the external enclosure with at least a portion of the control unit being housed within the second thermal shell. A heater that is controlled by the control unit may be disposed proximal to the second thermal shell for heating that shell. An auxiliary heater disposed within the first thermal shell for heating the sensor may also be included. Two thermistors may also be included for measuring the temperature of the sensor and the first thermal shell.

55 Claims, 8 Drawing Sheets

HEATED PRESSURE TRANSDUCER ASSEMBLY

FIELD OF THE INVENTION

The present invention relates generally to pressure transducer assemblies. More particularly, the present invention relates to a pressure transducer assembly having improved thermal characteristics.

BACKGROUND OF THE INVENTION

Various vapor deposition processes are known to be useful, for example, in the production of semiconductor products. These processes are typically used to deposit very thin layers of various substances including conductive, semiconductive and insulative materials onto a substrate. Vapor deposition processes typically require each deposited material to be transported to the deposition chamber in a gas state or vapor phase where it is condensed onto the work in process. Efficient operation of such a deposition process requires precise control of the pressure of the gases or vapors used in the process. Where the deposit material in its vapor phase has a relatively low condensation temperature (i.e., well below room temperature) the pressure of the material may be controlled using pressure transducers operating at room temperature. However, where the gas state or vapor phase of a deposit material has a relatively high condensation temperature, i.e., above room temperature, to avoid condensation, such materials are heated and maintained above their condensation temperatures, and thus heated transducers are usually required for measuring the pressures of these hot gases and vapors. Heated pressure transducers are also often heated to prevent sublimation or precipitation of solid material. For example, as is well known, ammonium chloride ($NH_4Cl$) is a chemical by-product of processes for depositing layers of silicon nitride ($Si_3N_4$), and if the pressure and temperature drop too low the $NH_4Cl$ sublimates so that a solid salt forms on any exposed cool surfaces. To prevent such sublimation of $NH_4Cl$, these processes are often conducted at 150° C.

FIG. 1 shows a sectional view of a portion of a prior art heated pressure transducer assembly 100 of the type that is typically used in connection with relatively high temperature, vapor deposition processes. Transducer assembly 100 includes a pressure sensitive sensor 110 that is housed within an interior cavity defined by an external enclosure or housing 112. Sensor 110 is of the capacitive type and includes an input port 110a for receiving the heated vaporized material and two output terminals (not shown) for providing an electrical signal representative of the pressure of the vaporized material entering the transducer assembly. The sensor 110 is configured with a capacitive element so that the measured capacitance created between the two output terminals varies according to a function of the pressure at input port 110a.

Transducer assembly 100 further includes a tube 114 for coupling a source of pressurized vapor to the input port 110a of sensor 110. The tube 114 is coupled at one end 114a to sensor 110 proximal to input port 110a, extends from end 114a through an aperture 112a formed in external enclosure 112, and is coupled at its other end 114b to a heated gas line 122 providing the source of heated pressurized vapor, indicated by numeral 124. Transducer assembly 100 further includes a thermal shell 116 fabricated from material having a relatively high thermal conductivity, a foil heater 118, and a control unit 120 (shown in FIG. 1A). A set of screws 121 (one of which is shown) securely mounts thermal shell 116 within enclosure 112. Foil heater 118 is wrapped around thermal shell 116, and sensor 110 is housed within thermal shell 116 so that tube 114 passes through an aperture 116a in shell 116. Control unit 120 (shown in FIG. 1A) controls the operation of heater 118, measures the capacitance across the output terminals of sensor 110 and generates therefrom a transducer output signal representative of the pressure at input port 110a.

In use, as shown in FIG. 1, end 114b of tube 114 is coupled to a heated gas line 122 containing a pressurized vapor 124 so as to provide a source of the heated, pressurized vapor 124 to input port 110a. Control unit 120 (of FIG. 1A) controls foil heater 118 so that thermal shell 116 and sensor 110 are maintained in substantial thermal equilibrium at a desired operating temperature (i.e., substantially at the same or near the desired temperature of the vapor 124 in line 122). External enclosure 112 is normally insulated from thermal shell 116 and heater 118 so that enclosure 112 normally settles at or near the ambient temperature, or room temperature, of the area surrounding enclosure 112.

Transducers such as heated transducer assembly 100 have been in use for many years, even though there are several problems associated with the transducer assembly. For example, when transducer assembly 100 is operated at relatively high temperatures, e.g., more than about 80° C., tube 114 becomes a critical source of heat loss. Although during operation, the sensor 110 and the vapor 124 in line 122 are heated to substantially the same operating temperature and the temperatures of both ends 114a, 114b of tube 114 approach this operating temperature, external enclosure 112, which is typically at or near the much cooler ambient temperature, physically contacts tube 114 and tends to thermally conduct a relatively large amount of heat away from tube 114 resulting in a temperature gradient across tube 114. When the heat loss from tube 114 becomes sufficient to cause condensation of the vapor 124 in tube 114, this heat loss adversely affects the accuracy of the pressure measurement provided by transducer assembly 100. Further, even when it is not sufficient to cause condensation, the heat loss from tube 114 may establish a temperature gradient across sensor 110 thereby disturbing the thermal equilibrium of sensor 110 and adversely affecting the accuracy of the pressure measurement provided by transducer assembly 100.

In an effort to control the temperature of tube 114, users of transducer assembly 100 have applied heaters and insulation to the portion of tube 114 extending between enclosure 112 and line 122. Such measures are not always satisfactory. Even when tube 114 is heated sufficiently to prevent condensation of the vapor 124 within tube 114, external enclosure 112 still conducts a relatively large amount heat away from tube 114 and thereby establishes a temperature gradient across tube 114 and sensor 110, and as previously mentioned this temperature gradient can adversely affect the accuracy of the pressure measurement provided by transducer assembly 100.

Users of transducer assembly 100 have also enclosed the entire assembly including external enclosure 112 and tube 114 within a "thermal blanket" in an attempt to prevent condensation of gas 124 within tube 114. However, such measures may cause over heating of the control unit and thereby reduce its lifetime, and may also disturb the thermal equilibrium of sensor 110 and thereby adversely affect the accuracy of the pressure measurement provided by transducer assembly 100.

External enclosure 112 also tends to conduct a relatively large amount of heat away from thermal shell 116 via screws 121, and this heat transfer may establish a temperature gradient across shell 116. In alternative embodiments, this heat loss is controlled by eliminating screws 121 and fixing external enclosure in place by clamping it to tube 114. However, such measures merely increase the heat transfer between tube 114 and enclosure 112 and thereby exacerbate the above-described problems.

Another deficiency of transducer assembly 100 relates to the temperature sensitive nature of control unit 120 (shown in FIG. 1A). As stated above, control unit 120 normally measures the capacitance across the output terminals of sensor 110 and generates therefrom the transducer output signal which is directly representative of the pressure at input port 110a. For example, the transducer output signal is often an electrical signal characterized by a voltage that is proportional to the pressure at input port 110a, and to generate such a signal control unit 120 provides linearization as well as compensation for higher order non-linear effects associated with sensor 110. Control unit 120 also controls the operation of heater 118.

The performance of control unit 120 is generally sensitive to temperature because many of the components used to construct control unit 120 are themselves temperature sensitive. Further, the life times of many of the components used to construct control unit 120 also depend on temperature so that transducer 100 suffers from increased failure rates when control unit 120 is operated at relatively high temperatures. It is therefore desirable to maintain the operating temperature of control unit 120 at a constant so that the performance of control unit 120 does not fluctuate with changes in the ambient temperature, and it is also desirable to operate control unit 120 at a relative low temperature to decrease its failure rate.

Many prior art heated pressure transducers are designed to maintain the temperatures of the sensor 110 and of the control unit 120 at 45° C., and such transducers are often referred to as "45 degree transducers". In 45 degree transducers, the control unit 120 is normally constructed from relatively inexpensive electronic components (i.e., "commercial components") that are rated to operate at the 45° C. temperature. In these units, the control unit 120 is normally mounted within the external enclosure 112 and thereby forms an integral part of the transducer assembly. Due to their relatively low operating temperature, 45 degree transducers enjoy relatively low failure rates, however, their 45° C. operating temperature is too low for many applications.

For many higher temperature applications, "100 degree transducers", which maintain the temperatures of their sensor 110 and their control unit 120 at 100° C., are used. In 100 degree transducers, the control unit 120 is normally constructed from relatively expensive electronic components (i.e., "military components") that are rated to operate at the 100° C. temperature, and the control unit is normally packaged as an integral part of the transducer 100. The use of military components increases the cost of such transducers, and even when these expensive components are used, such transducers suffer from increased failure rates do to the relatively high operating temperature.

For even higher temperature applications, "150 degree transducers", which maintain the temperatures of their sensor 110 at 150° C. are used. Since the 150° C. degree operating temperature is too high even for military components, the control unit 120 in such transducers is normally located remotely from sensor 110 so as to thermally isolate control unit 120 from sensor 110, and the control unit 120 is electrically coupled to sensor 110 and heater 118 by relatively long cables. However, the use of such long cables contributes noise and electrical instability to transducer assembly 100. Further, the packaging of the 150 degree transducers is inconvenient because the control unit 120 is not included as an integral part of the transducer.

Yet another deficiency of the prior art transducer assembly shown at 100 relates to its associated "start up" or "warm up" time. Transducer assembly 100 provides accurate measurements only when sensor 110 is in thermal equilibrium at the desired operating temperature, and the "warm up" time is the time required for transducer assembly 100 to transition from an initial "cold" or "room temperature" state to the desired thermal equilibrium. During warm up of transducer assembly 100, control unit 120 activates heater 118 and thereby applies heat to shell 116 in a controlled fashion so as to maintain the temperature of shell 116 at the desired operating temperature. Transducer assembly 100 includes a thermistor (which as is well known is a device having an electrical resistance that varies according to a function of the device's temperature), indicated at 164 in FIG. 1, disposed on thermal shell 116. Control unit 120 uses thermistor 164 to sense the temperature of thermal shell 116 and controls heater 118 accordingly so as to maintain the temperature of shell 116 at the desired operating temperature. Control unit 120 maintains the temperature of shell 116 equal to the desired operating temperature for as long as is required for sensor 110 to reach thermal equilibrium at the desired operating temperature. When the desired operating temperature is on the order of 150° C., the warm up time of transducer assembly 100 is typically on the order of several (e.g., four) hours, and such a long "warm up" time is often inconvenient.

To facilitate maintaining sensor 110 in thermal equilibrium, transducer assembly 100 normally provides an insulating air gap between thermal shell 116 and sensor 110. Although this air gap facilitates maintaining sensor 110 in thermal equilibrium after sensor 110 has been warmed up to the desired operating temperature, this insulating air gap inconveniently increases the time required to initially warm up sensor 110.

OBJECTS OF THE INVENTION

It is an object of the present invention to substantially reduce or overcome the above-identified problems of the prior art.

Another object of the present invention is to provide an improved heated pressure transducer assembly having improved thermal characteristics.

And another object of the present invention is to provide an improved heated pressure transducer assembly that provides independent temperature control of the sensor and of the control unit of the transducer.

Yet another object of the present invention is to provide an improved heated pressure transducer assembly that provides ventilation for cooling the transducer assembly without affecting the temperature of the vapor having its pressure measured.

Still another object of the present invention is to provide an improved heated pressure transducer assembly that provides a tube-heater for heating the tube that couples the sensor to a heated gas line.

And another object of the present invention is to provide an improved heated pressure transducer assembly that has a reduced warm up time compared to the FIG. 1 transducer.

Yet another object of the present invention is to provide an improved heated pressure transducer assembly that includes an auxiliary heater for heating the sensor.

Still another object of the present invention is to provide an improved heated pressure transducer assembly that includes two thermistors for sensing the temperatures of the sensor and a thermal shell enclosing the sensor.

SUMMARY OF THE INVENTION

These and other objects are provided by an improved heated pressure transducer assembly. In accordance with one aspect of the invention the transducer assembly includes an external enclosure, a first thermal shell housed within the external enclosure, and a sensor housed within the first thermal shell. The transducer assembly further includes a heater for heating the first thermal shell and a control unit for controlling the heater. A tube couples the sensor to a source of heated, pressurized gas or vapor and the transducer assembly may further include a tube-heater that is controlled by the control unit for applying heat to the tube.

In accordance with another aspect of the present invention, the transducer assembly may also include a second thermal shell housed within the external enclosure with at least a portion of the control unit being housed within the second thermal shell. A heater that is controlled by the control unit may be disposed proximal to the second thermal shell for heating that shell.

According to another aspect of the present invention, an auxiliary heater disposed within the first thermal shell for heating the sensor may also be included.

According to yet another aspect of the present invention, two thermistors may also be included for measuring the temperatures of the sensor and the first thermal shell.

Still other objects and advantages of the present invention will become readily apparent to those skilled in the art from the following detailed description wherein several embodiments are shown and described, simply by way of illustration of the best mode of the invention. As will be realized, the invention is capable of other and different embodiments, and its several details are capable of modifications in various respects, all without departing from the invention. Accordingly, the drawings and description are to be regarded as illustrative in nature, and not in a restrictive or limiting sense, with the scope of the application being indicated in the claims.

BRIEF DESCRIPTION OF THE DRAWINGS

For a fuller understanding of the nature and objects of the present invention, reference should be had to the following detailed description taken in connection with the accompanying drawings in which the same reference numerals are used to indicate the same or similar parts wherein.

DETAILED DESCRIPTION OF THE DRAWINGS

Figure 2A:
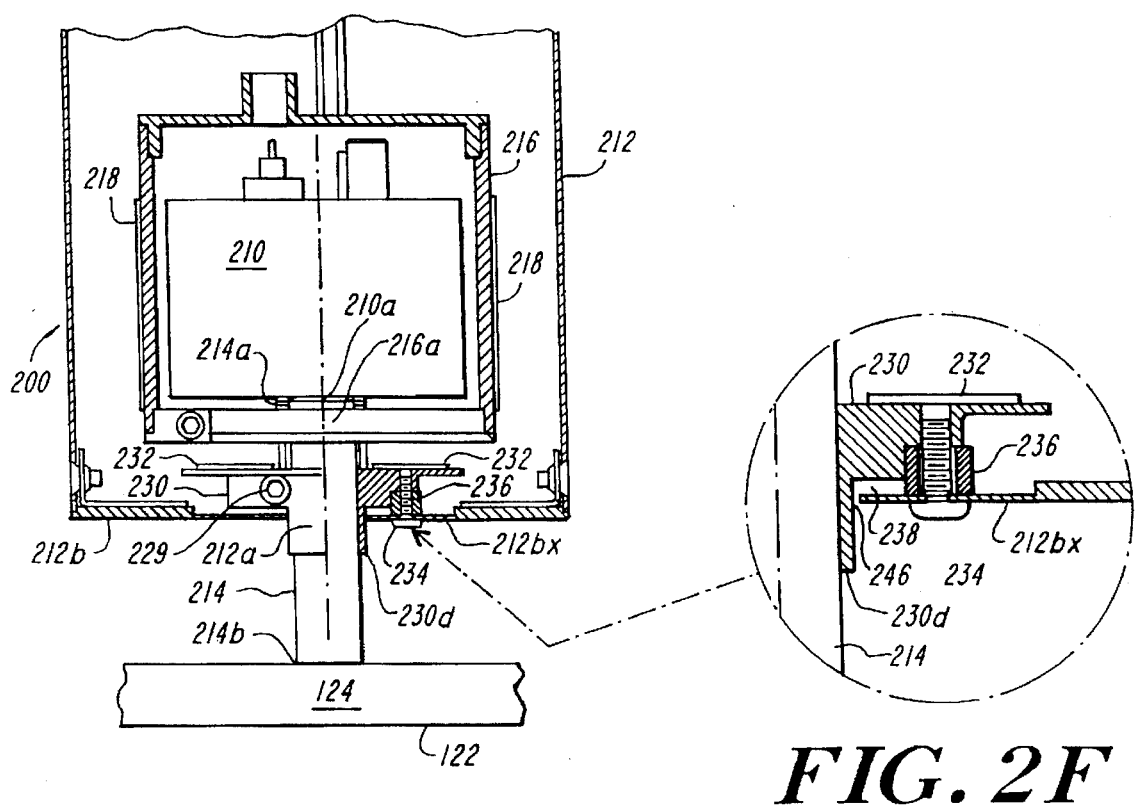
FIG. 2A shows a sectional view of one embodiment of an improved heated pressure transducer assembly constructed according to the invention and including a tube-heater.

FIG. 2A shows a sectional view of a heated pressure transducer assembly 200 constructed according to at least one aspect of the present invention. As will be discussed in greater detail below, transducer assembly 200 provides improved performance over that of prior art transducer assembly 100. Transducer assembly 200 may be advantageously used in connection with high temperature vapor deposition processes, and as those skilled in the art will appreciate, transducer assembly 200 may be used for many other applications as well, such as for example in connection with reactive ion etching processes.

Transducer assembly 200 includes a pressure sensitive sensor 210 that is housed within an interior cavity defined by an external enclosure 212, and includes an input port 210a for receiving a gas or vapor whose pressure is to be measured. Sensor 210 may be, for example, a capacitive type sensor including two output terminals (not shown) configured so that the capacitance, as measured between the two output terminals, is related to and a function of the pressure at input port 210a. Sensor 210, however, may be implemented using any form of pressure sensitive transducer having an operating parameter which can be measured that varies according to a function of pressure. Transducer assembly 200 further includes a tube 214 for coupling the input port 210a to a source of pressurized gas or vapor. The tube 214 includes one end 214a coupled to sensor 210 proximal to input port 210a, extends through an aperture 212a defined in a bottom plate 212b of external enclosure 212, and has its opposite end 214b coupled to the gas line 122 carrying the heated vapor 124.

Figure 2F:
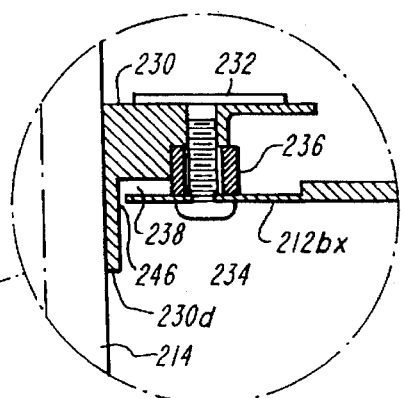
FIG. 2F shows a detail enlarged view of a portion of the transducer assembly of FIG. 2A.
Figure 2B:
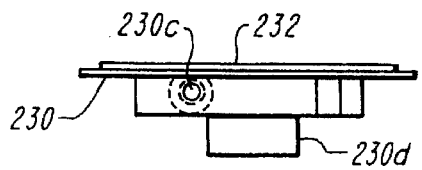
FIGS. 2B and 2C shows end and top views, respectively, of the tube-clamp shown in FIG. 2A.
Figure 2C:
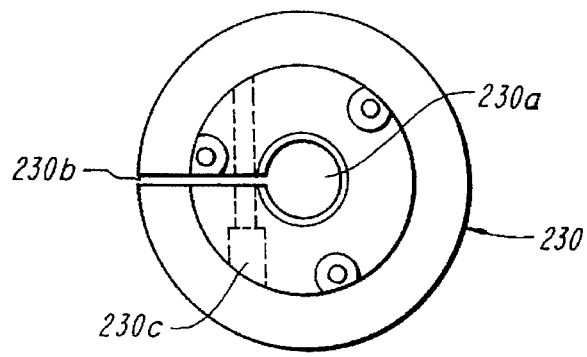
Figure 2D:
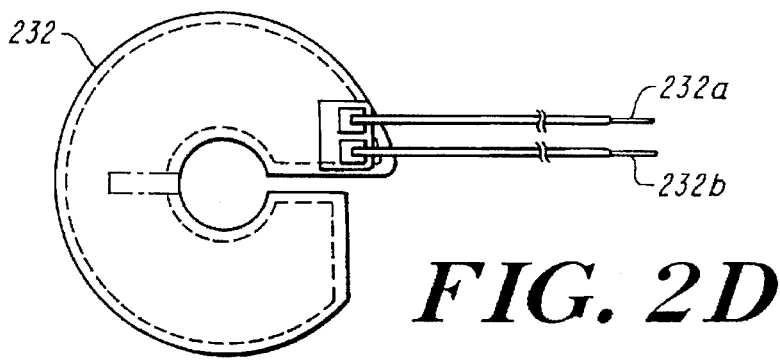
FIG. 2D shows a top view of the tube-heater shown in FIG. 2A.
Figure 2E:
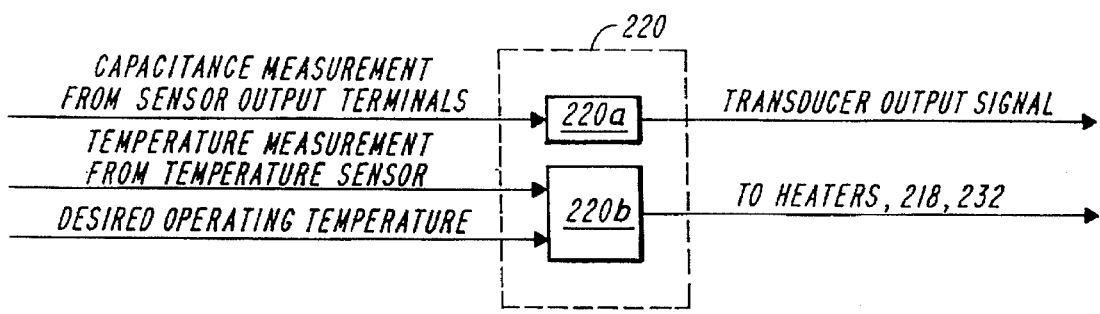
FIG. 2E shows a block diagram of a control unit used in the embodiment described with respect to FIGS. 2A–2D.

Transducer assembly 200 further includes a thermal shell 216 preferably fabricated from material having a relatively high thermal conductivity, a heater 218, and a control unit 220 (the latter being shown in FIG. 2E). Sensor 210 is housed within thermal shell 216 and tube 214 passes through an aperture 216a in shell 216. Thermal shell 216 preferably securely clamps to tube 214 proximal to aperture 216a and thereby remains in a fixed position within external enclosure 212. Heater 218 is disposed proximal to thermal shell 216, and heater 218 is preferably implemented using a foil heater (i.e., a relatively flexible, resistive type, heater) that is wrapped around and secured to an outer portion of thermal shell 216. As seen in FIG. 2E, the preferred control unit 220 includes a signal conditioner 220a for sensing the value of the capacitance between the output terminals of sensor 210 and generating therefrom a transducer output signal representative of the pressure at input port 210a. Control unit 220 also preferably includes a controller 220b for controlling the operation of heater 218, as is described hereinafter in greater detail.

In accordance with one aspect of the present invention, as shown in FIGS. 2A and 2F, transducer assembly 200 additionally includes a tube-clamp 230 that is preferably made from material having a relatively high thermal conductivity and a tube-heater 232. Preferably tube-clamp 230 securely clamps to tube 214, and suitable means, such as a set of screws 234 (one of which is shown in each FIG. 2A and 2F) securely mounts bottom plate 212b of external enclosure 212 to tube-clamp 230. Each of the screws 234 extends through a tubular thermally insulating standoff or spacing collar 236, the standoffs 236 being configured so that when screws 234 are tightened, the standoffs 236 maintain a gap 238 between tube-clamp 230 and bottom plate 212b. Standoffs 236 are made of a thermally insulative material such as plastic or the like so as to thermally insulate tube-clamp 230 from plate 212b, and reduce heat flow between tube-clamp 230 and external enclosure 212.

FIGS. 2B and 2C show end and top views, respectively, of tube-clamp 230. Tube-clamp 230 defines a central aperture 230a, a slot 230b, and a screw-hole 230c. When tube-clamp 230 is mounted to transducer assembly 200 (as shown in FIG. 2A), tube 214 extends through central aperture 230a. The size of aperture 230a may be adjusted by turning a screw (shown at 229 in FIG. 2A) inserted in screw-hole 230c and thereby expanding or contracting slot 230b. When tube-clamp 230 is mounted in transducer assembly 200, the screw in screw-hole 230c is adjusted to sufficiently shrink aperture 230a so that tube-clamp 230 securely clamps, and makes good thermal contact with, tube 214. Tube-heater 232, a preferred embodiment of which is shown in FIG. 2D, is disposed so as to provide good thermal contact with tube-clamp 230 so that the tube-heater efficiently provides heat to tube-clamp 230. Preferably, tube-heater 232 is implemented using a foil heater and is disposed on and secured in good thermal contact with the upper surface of tube-clamp 230 as shown in FIG. 2B. As shown in FIGS. 2D and 2E, in addition to controlling the temperature of heater 218, control unit 220 also controls the temperature of tube-heater 232 by applying current to tube-heater 232 via electrical leads 232a, 232b in response to the temperature sensed by suitable temperature sensing means to be described hereinafter.

In addition to the above, insulation (not shown) is preferably wrapped around the portion of tube 214 extending from bottom plate 212b of the external enclosure 212 to the heated line 122, and no additional heaters are applied to tube 214. In operation, the vapor 124 in line 122 is heated to a desired temperature, and heater 218 heats sensor 210 to the same operating temperature. Tube-heater 232 heats tube-clamp 230 and thereby heats tube 214 to the same, or nearly the same, operating temperature. Since tube-heater 232 effectively heats the portion of tube 214 proximal to plate 212b to the same temperature as the heated vapor 124 in line 122, and since tube 214 is insulated between plate 212b and gas line 122, little or no heat is transferred between the vapor 124 and tube 214. Tube-heater 232 thereby prevents condensation of gas within tube 214 and also substantially reduces or eliminates heat gradients from tube 214 and thereby improves the accuracy of transducer assembly 200.

Tube-clamp 230 and tube-heater 232 provide a thermal buffer between tube 214 and external enclosure 212 and thereby reduce the amount of heat that external enclosure 212 conducts away from tube 214. In other preferred embodiments, transducer assembly 200 includes several features each of which further reduce the amount of heat that external enclosure 212 conducts away from tube 214. Preferably, as shown in FIGS. 2A and 2F, tube-clamp 230 includes a collar 230d, which may or may not be formed as an integral part of the tube-clamp, that extends parallel to tube 214 through aperture 212a of the bottom plate 212b of the external enclosure 212, and thereby prevents plate 212b from directly contacting tube 214 and reduces the amount of heat that external enclosure 212 conducts away from tube 214. Further, as shown in FIG. 2F, aperture 212a of the bottom plate 212b is preferably larger in diameter than the diameter of collar 230d so that there is a gap 246 between plate 212b and collar 230d, and this gap further reduces the amount of heat that external enclosure 212 conducts away from tube 214 (as well as reducing the amount of heat that external enclosure 212 conducts away from tube-clamp 230). Still further, plate 212b preferably includes an internal annular region of reduced thickness 212bx proximal to aperture 212a as shown in FIG. 2F. Due to its reduced thickness, this region 212bx has a higher thermal resistance than the rest of plate 212b and thereby further reduces the amount of heat that external enclosure 212 conducts away from tube-clamp 230.

Figure 1A:
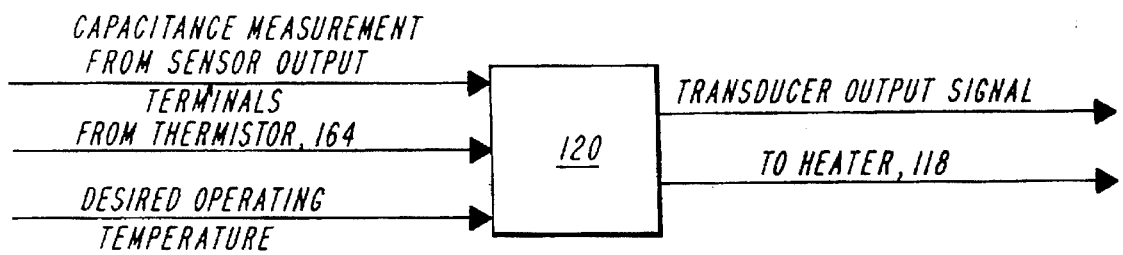
FIG. 1A shows a block diagram of a control unit used in the FIG. 1 embodiment.
Figure 1:
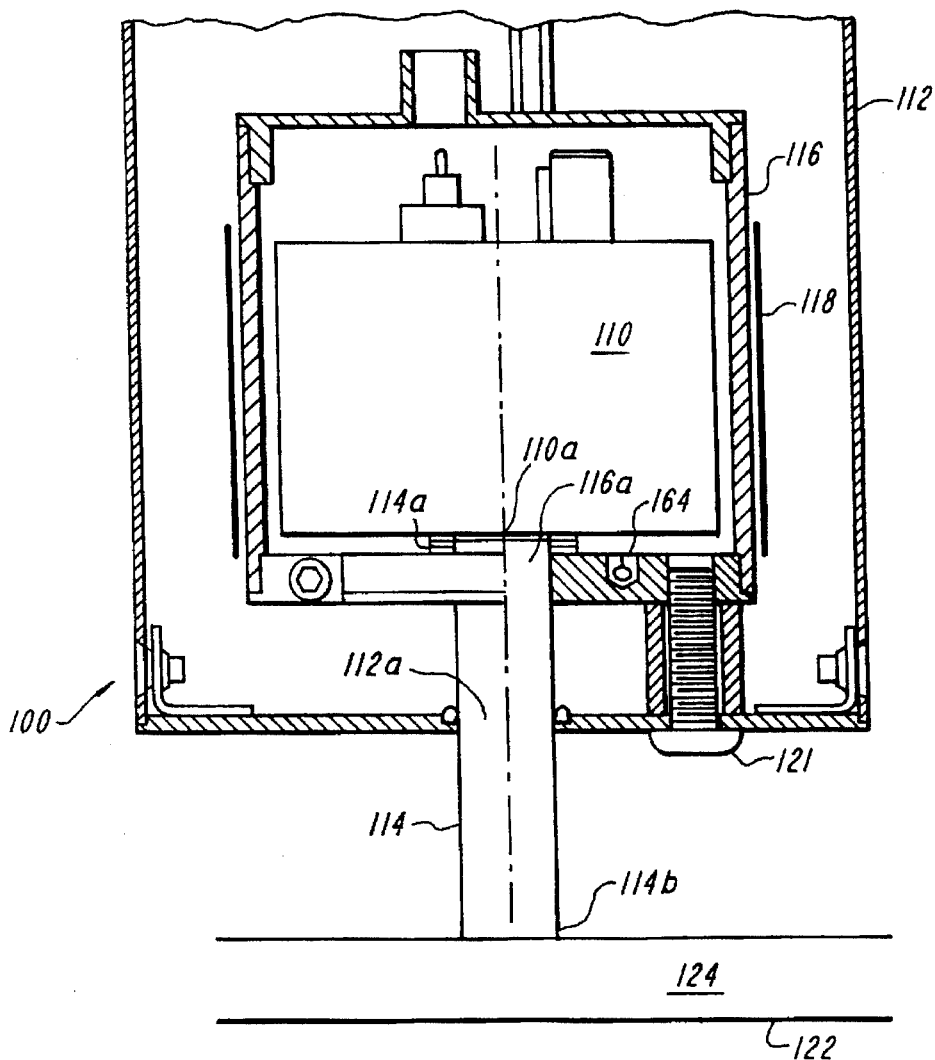
FIG. 1 shows a sectional view of a prior art heated pressure transducer assembly coupled to a heated gas line.

As stated above, purchasers of prior art heated pressure transducer assemblies such as the one shown in FIG. 1 at 100, typically have had to apply heaters to the tube 114 coupling the transducer assembly 100 to a heated gas line 122. Although such heaters have been useful for preventing condensation within the tube 114, use of such heaters adversely affects the accuracy of the transducer assembly because they typically established heat gradients across the sensor 110. In contrast, the additional tube-heater 232 of FIGS. 2A, 2D and 2F is incorporated as a part of and is controlled by transducer assembly 200. Purchasers of transducer assembly 200 therefore need not apply external heaters to tube 214 when transducer assembly 200 is coupled to a source of heated gas or vapor such as line 122. Tube-heater 232 improves the accuracy of transducer assembly 200 by preventing condensation from occurring within tube 214 as well as by dramatically reducing heat gradients across tube 214.

Further, whereas in transducer assembly 100, external enclosure 112 attaches to thermal shell 116, in transducer assembly 200, external enclosure 212 attaches to tube-clamp 230 (e.g., via screws 234). So, the external enclosure tends to conduct heat away from tube-clamp 230 rather than from thermal shell 216 and therefore external enclosure 212 does not contribute to temperature gradients across thermal shell 216 and sensor 210 as was common in the prior art.

In addition to a signal representing the desired operating temperature, at least one temperature sensor (not shown) preferably is used to provide an input signal to the controller 220b of FIG. 2E to indicate the actual temperature at some select location on or in the transducer assembly, or alternatively more than one temperature sensor (not shown) can be used to provide an indication of the temperature at more than one location on or in the transducer assembly (e. g., one temperature sensor may be used to measure the temperature of sensor 210 and another temperature sensor may be used to measure the temperature of tube-clamp 230). Controller 220b may include two separate controllers, such as PID (proportional, integral, and derivative) controllers, one controller for controlling heater 218 and another controller for controlling tube-heater 232. Alternatively, control unit 220 may use a single controller to control the operation of both heaters 218,232 in response to the input temperature indicating signals. A single controller may control both heaters by, for example, insuring that the ratio of the currents applied to heaters 218 and 232 is a constant.

While preferred embodiments of transducer assembly 200 include tube-clamp 230 and tube-heater 232, improved thermal control over the prior art of tube 214 may be achieved by embodiments of assembly 200 that do not include tube-clamp 230 and tube heater 232. In such embodiments, apperture 212a is large enough so that bottom plate 212b does not contact tube 214 and insulation (not shown) is preferably wrapped around the entire length of, or portions of, tube 214.

As stated above, in certain prior art heated pressure transducers, the control unit is formed as an integral part of the transducer assembly. However, these transducer assemblies use relatively low operating temperatures (e.g., 45° C.), use expensive military rated components, or suffer from relatively short lifetimes. Accordingly in many other prior art heated pressure transducer assemblies the control unit is located remotely from the transducer assembly to prevent the heat that is applied to the sensor from adversely affecting the performance of the temperature sensitive control unit. Typically, the control unit is connected to the transducer assembly with cables. However, locating the control unit remotely from the transducer assembly provides an inconvenient packaging for the transducer assembly as well as increasing the electrical instability of the transducer assembly and increasing the noise in the output of the transducer.

In contrast to the prior art, in accordance with yet another aspect of the present invention, control unit 220 is formed as an integral part of the transducer assembly 200, wherein the temperature of control unit 220 is controlled independently from the temperature of sensor 210. Eliminating the long cables normally used to couple the control unit to the sensor improves the stability and noise immunity of transducer assembly 200, and independently controlling the temperature of control unit 220 provides for a longer life time of transducer assembly 200 and allows transducer assembly 200 to perform consistently and repeatedly over a wide range of operating temperatures of sensor 210. Further, including control unit 220 as an integral part of transducer assembly 200 provides a convenient packaging for a heated transducer. Preferably the temperature of control unit 220 is controlled to be a constant that is less than or equal to 60° C. since this permits control unit 220 to be fabricated from relatively inexpensive electronic components that are not rated to operate above this temperature. Higher operating temperatures of control unit 220 are of course possible and in this case control unit is preferably fabricated from more expensive electrical components (e.g., military rated components) that have a higher operating temperature range. In any case, the temperature of control unit 220 is controlled to be lower than that of sensor 210.

Figure 3:
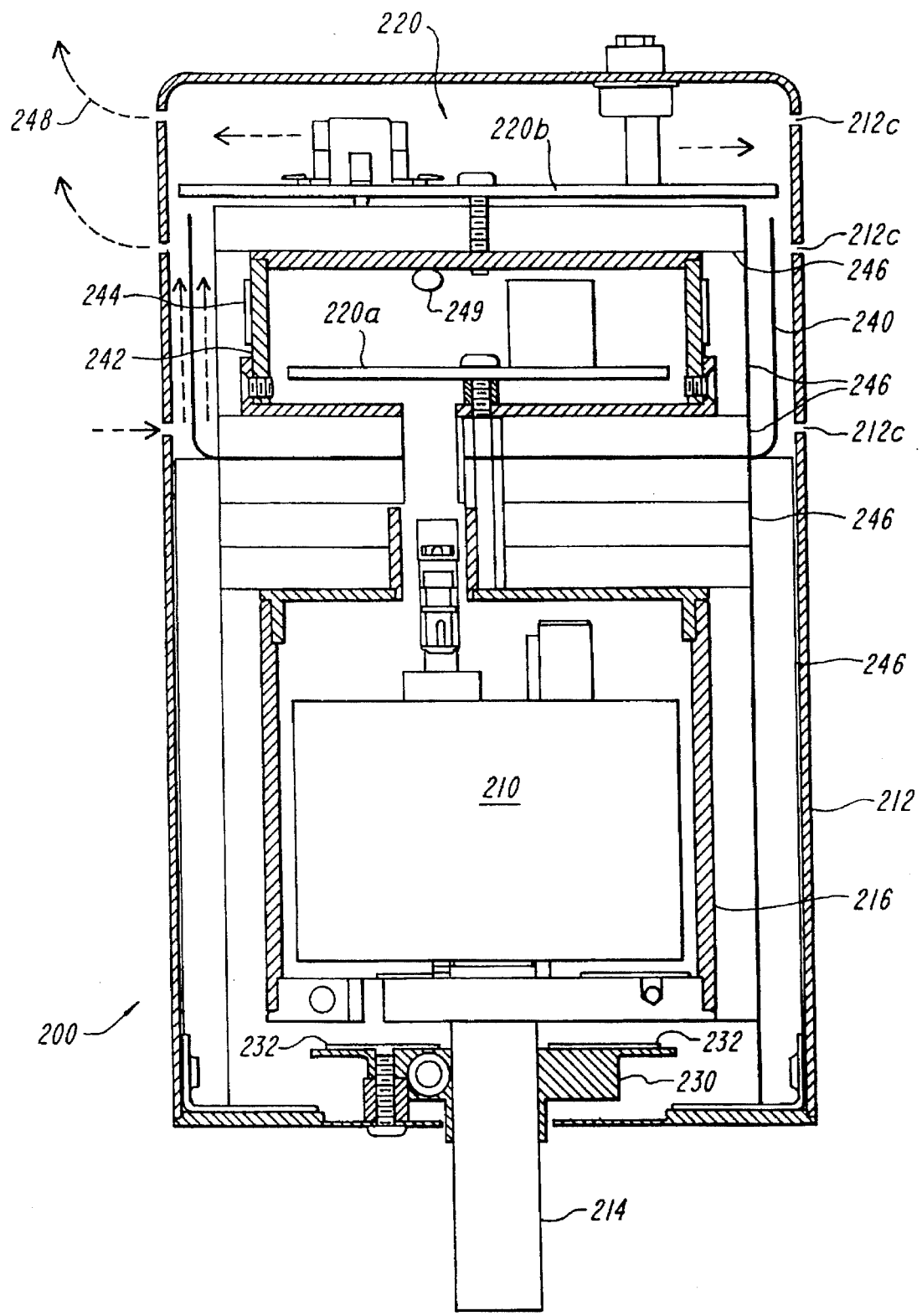
FIG. 3 shows a sectional view of one embodiment of a heated pressure transducer assembly constructed according to the invention that provides venting for cooling the control unit.

FIG. 3 shows one embodiment of transducer assembly 200 in which control unit 220 is formed integrally as a part of transducer assembly 200. In this embodiment, transducer assembly 200 additionally includes a thermal-shunt 240 that is preferably fabricated from material having a relatively high thermal conductivity and is disposed so as to divide the internal cavity defined by external enclosure 212 into a lower portion and an upper portion. Sensor 210 is housed below shunt 240 in the lower portion of the internal cavity and control unit 220 is housed above shunt 240 in the upper portion of the internal cavity. In the illustrated embodiment, control unit 220 is implemented using two printed circuit (PC) boards 220a, 220b. Transducer assembly 200 also includes a thermal shell 242 of a relatively high thermally conductive material for housing PC board 220a, and a heater 244, disposed in thermal contact with shell 242, that is operated under the control of control unit 220. PC board 220b is housed above thermal shell 242. External enclosure 212 further defines a plurality of slots, or vents, or apertures, 212c, which as will be discussed in greater detail below are useful in providing cooling. Insulation 246 is preferably disposed between thermal shell 242 and thermal shunt 240, and also between thermal shell 216 and external enclosure 212. Transducer assembly 200 also preferably includes a thermistor 249 disposed to be in thermal contact with thermal shell 242 for measuring the temperature of shell 242.

Control unit 220 self-regulates its own temperature thereby obviating the need for locating the control unit remotely. Therefore, all of the components of transducer assembly 200 are conveniently packaged within external enclosure 212 and transducer assembly 200 provides improved stability and noise immunity.

In operation, thermal shunt 240 and vents 212c cooperate to provide convective cooling and thereby maintain a desired temperature differential between sensor 210 and control unit 220. Arrows 248 illustrate the direction of air flow through transducer assembly 200. Insulation 246 prevents some heat from being transferred from sensor 210 to control unit 220, and thermal shunt 240 conducts excess heat away from sensor 210 towards the perimeter of transducer 200 where cooling air currents flowing through vents 212c conduct the heat away from transducer 200. While in other embodiments of transducer 200, active refrigeration units (not shown) could of course be employed to maintain a desired temperature differential between control unit 220 and sensor 210, in the preferred embodiments no such refrigeration units are used. In the embodiment illustrated in FIG. 3, when heater 244 remains inactive, thermal shunt 240 and vents 212c provide sufficient cooling to maintain the temperature of thermal shell 242 and control unit 220 below the desired operating temperature of unit 220. So in operation, control unit 220 may maintain thermal shell 242 and control unit 220 in thermal equilibrium at the desired operating temperature simply by using heater 244 to apply heat to thermal shell 242 (i.e., no active refrigeration is required). Control unit 220 preferably includes a controller, such as a PID controller for controlling heater 244 in response to a temperature measurement of shell 242 provided by thermistor 249.

In the illustrated embodiment of FIG. 3, control unit 220 is implemented using two PC boards 220a, and 220b, and only board 220a is located within thermal shell 220, while the other board 220b is located above the shell. In general, with this arrangement the most temperature sensitive components of control unit 220 are located on board 220a, and the components of control unit 220 that produce the most heat are located on board 220b. Controller 220 controls heater 244 so as to maintain thermal shell 242 and board 220a in thermal equilibrium whereas the temperature of board 220b is allowed to fluctuate slightly away from the equilibrium temperature as a function of the convective air currents and the amount of heat generated by PC board 220b. Including only PC board 220a within shell 242 simplifies the thermal control of unit 220, however, in other embodiments all of control unit 220 could of course be located within thermal shell 242.

Preferably, control unit 220 maintains its own temperature so that it is substantially constant, e.g. at 60° C., regardless of the operating temperature of sensor 210. The embodiment illustrated in FIG. 3 provides sufficient cooling for maintaining at least a 90° C. difference between sensor 210 and controller 220. Sensor 210 may therefore be operated at least as hot as 150° C. without interfering with the desired 60° C. operating temperature of control unit 220. When sensor 210 is maintained at an operating temperature of 150° C. transducer assembly 200 is ideally suited for use with silicon nitride chemical vapor deposition processes.

Figure 4:
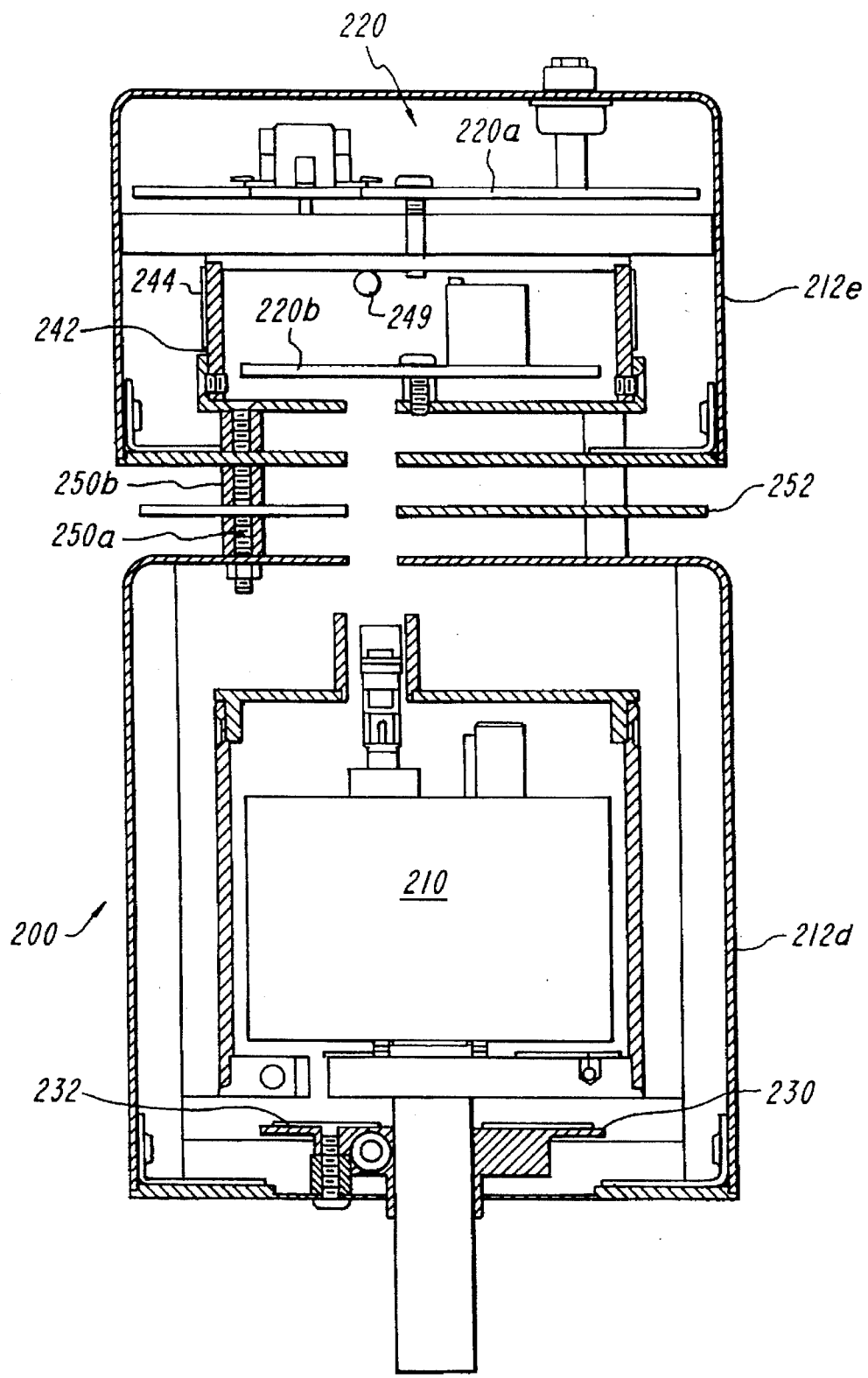
FIG. 4 shows a sectional view of yet another embodiment of a heated pressure transducer assembly constructed according to the invention that provides venting for cooling the control unit.

FIG. 4 shows a sectional view of still another aspect of the present invention, wherein the transducer assembly 200 shown provides additional cooling when compared to the embodiment illustrated in FIG. 3. In the embodiment illustrated in FIG. 4, external enclosure 212 includes a lower enclosure, or lower compartment, 212d and an upper enclosure, or upper compartment, 212e that are fixed relative to one another by suitable means such as a set of screws 250a (one of which is shown). Each of the screws extends through a respective one of a set of tubular thermally insulating standoffs or thermally insulative spacing collars 250b, which are preferably fabricated from thermally insulating material such as plastic, so that when screws 250a are tightened the standoffs 250b maintain a selected spacing between enclosures 212d, 212e. This embodiment of transducer assembly 200 further includes a thermal shunt, or radiating fin, 252 (formed as an annular disk) that is fabricated from material having a relatively high thermal conductivity, is disposed between lower and upper enclosures 212d, 212e, and is in thermal contact with standoffs 250b. Thermal shunt 252 helps shield upper enclosure 212e from the heat generated in lower enclosure 212d, and also provides dissipation for any heat flowing along standoff 250b. The openings in the space between lower and upper enclosures 212d, 212e provides increased venting.

In operation, controller 220 of FIG. 4 preferably maintains its own temperature at 60° C. The venting provided by this embodiment provides sufficient cooling to maintain controller 220 in thermal equilibrium at least 140° C. below the temperature of sensor 210. Sensor 210 may therefore be operated at least as hot has 200° C. without interfering with the desired 60° C. operating temperature of control unit 220.

Figure 5:
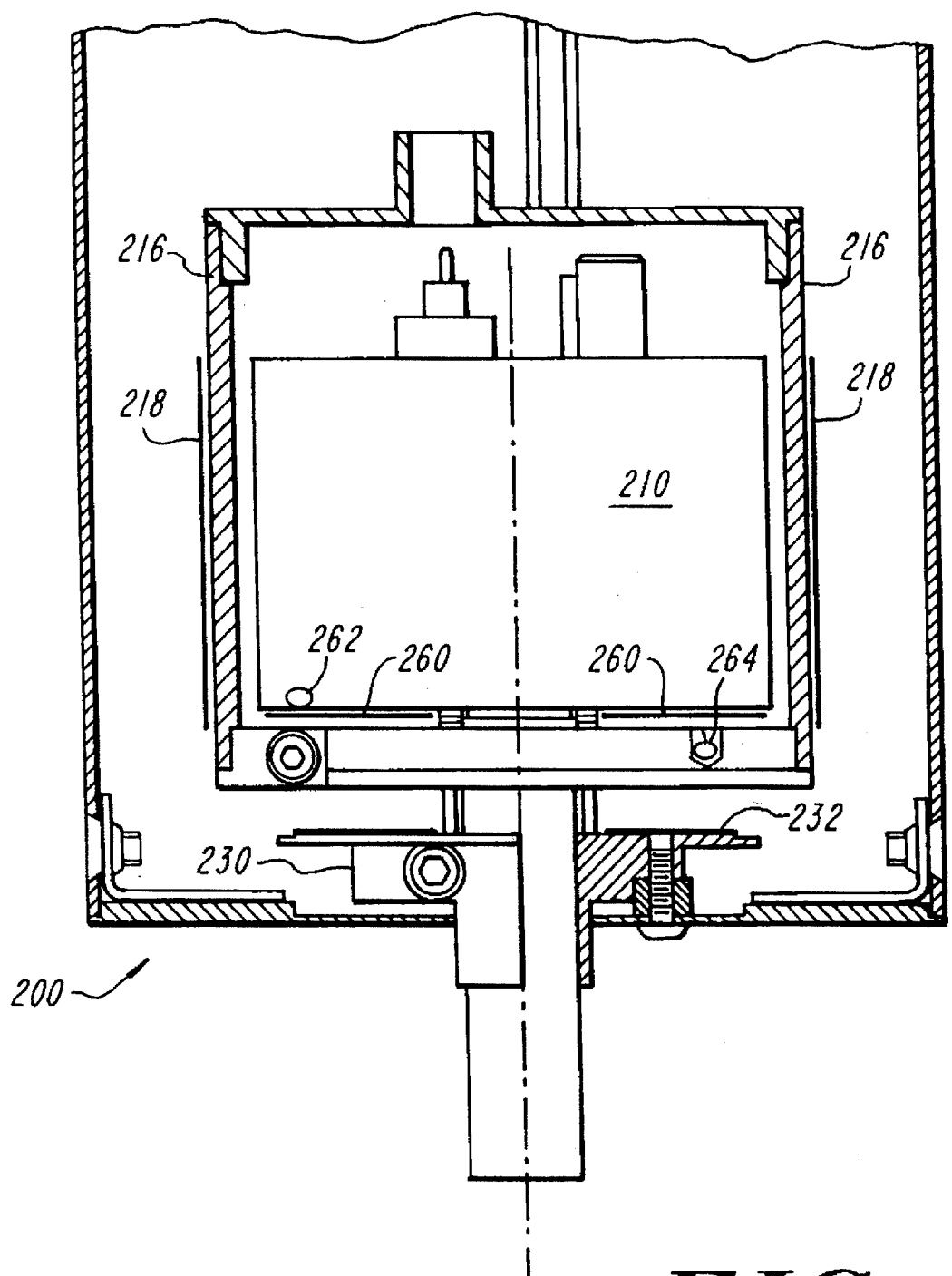
FIG. 5 shows a sectional view of an embodiment of a heated pressure transducer assembly constructed according to the invention and including an auxiliary heater and two thermistors.

In yet another aspect of the present invention, transducer assembly 200 includes means for providing a reduced warm up time. FIG. 5 illustrates a portion of a preferred embodiment of the means for providing a reduced warm up time which includes an auxiliary heater 260 as well as two thermistors 262, 264. Auxiliary heater 260 is preferably disposed within thermal shell 216 proximate to sensor 210 for applying heat to sensor 210 under the control of control unit 220. Thermistor 262 is also disposed within thermal shell 216, in thermal contact with sensor 210, for providing control unit 220 with a measurement of the temperature of sensor 210. Thermistor 264 is disposed in thermal contact with thermal shell 216 for providing control unit 220 with a measurement of the temperature of shell 216. Since the temperatures of thermistors 262 and 264 are typically much higher than that of control unit 220, thermistors 262 and 264 are preferably fixed to sensor 210 and thermal shell 216, respectively, with suitable means such as thermal anchors.

Figure 6:
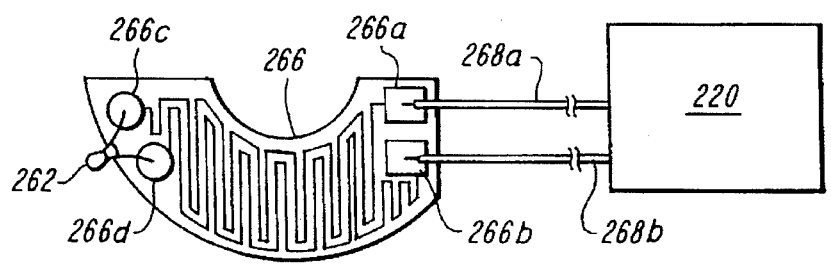
FIG. 6 shows a thermal anchor of the type used for thermally anchoring the thermistors shown in FIG. 5.

Referring to FIG. 6, the latter shows thermistor 262 electrically coupled to control unit 220 via a thermal anchor 266. Specifically, control unit 220 is electrically coupled to two leads 268a and 268b, which are in turn electrically coupled to two pads 266a and 266b, respectively, of thermal anchor 266. Pad 266a is electrically connected to another pad 266c, and pad 266b is electrically connected to another pad 266d, and finally the terminals of thermistor 262 are electrically coupled to pads 266c and 266d. Thermal anchor 266, which is a relatively good heat conductor, is fixed to sensor 210 (not shown) and thermistor 262 also preferably contacts sensor 210.

Leads 268a and 268b are good electrical conductors and consequently are also relatively good thermal conductors. If thermal anchor 266 were not used and the relatively cool (e.g., 50° C.) and control unit 220 coupled directly to the relatively hot (e.g., 150° C.) thermistor 262 via leads 268a, 268b, then heat would tend to flow from thermistor 262 via leads 268a, 268b, to control unit 220. Since thermistor 262 is a relatively small device, this amount of heat flow would lower the temperature of thermistor 262 and thereby disturb the temperature measurement of sensor 210. Fixing the relatively large thermal anchor 266 to sensor 210 tends to stabilize the temperature of thermistor 262 and insures that most of the heat flowing along leads 268a, 268b comes from sensor 210 rather than from thermistor 262. Thermistor 264 is of course also preferably coupled to thermal shell 216 with a thermal anchor similar to that of anchor 266 and similarly, all other thermistors in transducer assembly 200 (such as thermistor 249) are preferably coupled to the devices that they provide a temperature measurement of with thermal anchors.

As stated above, prior art transducer assembly 100 (shown in FIG. 1) is warmed up by heating thermal shell 116 to the desired operating temperature $T_d$ and then waiting as long as is required for sensor 110 to converge to this temperature. Control unit 120 uses thermistor 164 to sense the temperature of thermal shell 116 and controls heater 118 accordingly so as to maintain the temperature of shell 116 equal to the desired operating temperature $T_d$. In contrast to the prior art, in transducer assembly 200 (shown in FIG. 5), controller 220b of control unit 220 uses thermistors 262 and 264 to measure an average temperature $T_{Ave}$, where $T_{Ave}$ is equal to an average of the temperatures of the sensor 210 and thermal shell 216, and control unit 220 controls heater 218 so as to maintain this average temperature $T_{Ave}$ equal to the desired operating temperature $T_d$. So, whereas in prior art transducer assembly 100 the temperature of thermal shell 116 never exceeds the desired operating temperature $T_d$, in transducer assembly 200 the temperature of thermal shell 216 may exceed $T_d$ as long as the temperature of sensor 210 is below $T_d$.

Figure 7A:
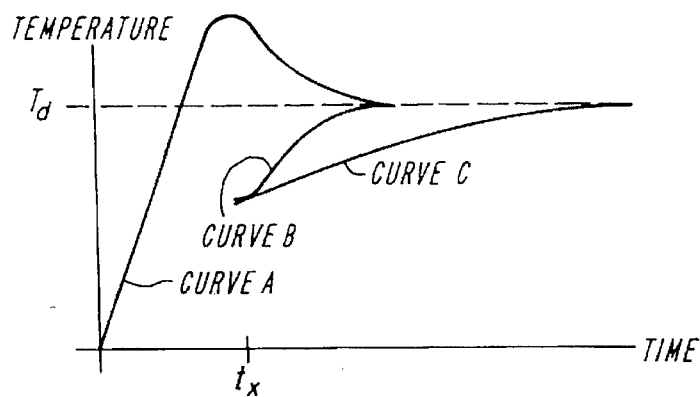
FIGS. 7A–7C show graphs of temperature versus time illustrating the improvement in warm up time provided by heated pressure transducers constructed according to the invention.

FIG. 7A shows three curves, curves A, B, and C which illustrate the benefits provided by thermistors 262, 264. Curves A and B illustrate the temperatures of thermal shell 216 and sensor 210, respectively, as functions of time. During warm up of transducer assembly 200, controller 220b controls heater 218 so as to increase the temperature of thermal shell 216, preferably at the maximum available rate, until the average temperature $T_{Ave}$ is equal to the desired operating temperature $T_d$. As shown in curves A and B, controller 220b uses heater 218 to increase the temperature of shell 216 until a time $t_x$ when the average temperature $T_{Ave}$ (obtained by adding the values on curves A and B at this moment in time and dividing by two) is equal to the desired operating temperature $T_d$. For all time following $t_x$, control unit 210 maintains the average temperature $T_{Ave}$ equal to $T_d$, so as the temperature of sensor 210 increases towards $T_d$, the temperature of shell 216 is correspondingly decreased so as to maintain the average temperature $T_{Ave}$ at a constant. Curve C illustrates the temperature of prior art sensor 110 as a function of time during warm up of transducer assembly 100. As shown by curves B and C, sensor 210 converges to the desired operating temperature $T_d$ much more quickly than does sensor 110 of prior art transducer assembly 100.

In both transducers 100 and 200, the amount of heat transferred from the thermal shell to the sensor is a function of the difference between the temperatures of these two components. During warm up, the temperature difference between shell 216 and sensor 210 of transducer assembly 200 (as shown by the values of curves A and B at, for example, time $t_x$) is greater than the temperature difference between shell 116 and sensor 110 of prior art transducer assembly 100. Since this temperature difference is greater in transducer assembly 200, more heat is transferred from the thermal shell to the sensor when the sensor is warming up and sensor 210 therefore warms up more quickly than does sensor 110.

In alternative embodiments of the embodiment shown in FIG. 5, thermistors 262 and 264 are each separately coupled to controller 220b and controller 220b independently measures the temperature of each thermistor and then computes the average temperature $T_{Ave}$. However, it may be preferable to couple thermistors 262 and 264 in series between controller 220b and an electrical ground, since in this configuration, controller 220b may measure the average temperature $T_{Ave}$ simply by measuring the total series resistance of the two thermistors. In one such embodiment, thermistors 262 and 264 have substantially identical temperature coefficients and are linear over an operating range of temperatures so that the resistance of thermistor 262 ($R_{262}$) is substantially equal to a constant c times the temperature of thermistor 262 ($T_{262}$), and the resistance of thermistor 264 ($R_{264}$) is substantially equal to the constant c times the temperature of thermistor 264 ($T_{264}$). In this embodiment, controller 220b may measure the average temperature $T_{Ave}$ of thermistors 262, 264 simply by measuring the value of the total series resistance $R_T$ (i.e., $R_{262}$ plus $R_{264}$) and then dividing this value by two times the constant c, as is described by the formula shown in the following Equation (1):

$$R_T = R_{262} + R_{264} = c(T_{262} + T_{264}); \text{ and } T_{Ave} = \frac{R_T}{2c} \quad (1)$$

However, it may be preferable for the temperature coefficients of thermistors 262 and 264 to be different so that the average temperature $T_{Ave}$ measured by controller 220b is a weighted average of the temperatures of thermistors 262 and 264. For example, if $R_{262}$ is substantially equal to a first constant $c_1$ times $T_{262}$, and if $R_{264}$ is substantially equal to a second constant $c_2$ times $T_{264}$, then the total series resistance $R_T$ is equal to a weighted average of the temperatures as described by the formula shown in the following Equation (2):

$$R_T = R_{262} + R_{264} = c_1 T_{262} + c_2 T_{264} \quad (2)$$

Figure 7B:
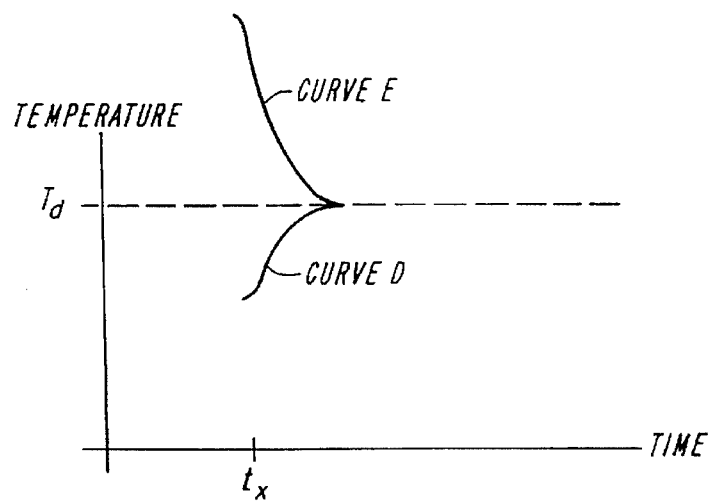

If the temperature coefficient of thermistor 262 is chosen to be greater than that of thermistor 264 (i.e., $c_1 > c_2$) then the average temperature $T_{Ave}$ measured by control unit 220 will be weighted so that when control unit 220 maintains the weighted average temperature $T_{Ave}$ equal to the desired operating temperature $T_d$, the difference between the temperature of thermal shell 216 and $T_d$ will be greater than the difference between $T_d$ and the temperature of sensor 210. FIG. 7B shows curves D and E, and these curves illustrate the temperatures of sensor 210 and thermal shell 216, respectively, as functions of time when the temperature coefficient of thermistor 262 is greater than that of thermistor 264. Skewing the temperature coefficients in this fashion causes increased heat transfer from thermal shell 216 to sensor 210 during warm up and therefore decreases the warm up time of transducer assembly 200. As those skilled in the art will appreciate, in other embodiments in which thermistors 262, 264 are not coupled in series and are instead independently coupled to controller 220b, controller 220b may compute a weighted average of the temperatures of sensor 210 and thermal shell 216 even if thermistors 262, 264 have identical temperature coefficients. Further, as those skilled in the art will appreciate, thermistors 262, 264 as well as all the other thermistors in transducer assembly 200 need not be implemented using thermistors, and rather may be implemented using any temperature sensitive device, such as, for example, resistive temperature devices (RTDs) or thermocouples.

During warm up of transducer assembly 200, control unit 220 controls heater 218 to apply heat to thermal shell 216 and also preferably controls auxiliary heater 260 (shown in FIG. 5) to apply heat directly to sensor 210. Control unit 220 preferably includes a controller 220d, such as a PID controller, for controlling heater 260 in response to the temperature of sensor 210 as sensed by thermistor 262. In one preferred mode of operation, controller 220d uses auxiliary heater 260 to apply a fixed amount of heat to sensor 210 during warm up. This may be accomplished, for example, by implementing controller 220d using a timer that activates auxiliary heater 260 for a fixed time period after an initial power up of transducer assembly 200 and then disables auxiliary heater 260 until the next power up. In this mode of operation, heater 218 and auxiliary heater 260 cooperate to heat sensor 210 until the temperature of sensor 210 approaches the desired operating temperature. Auxiliary heater 260 is then disabled and heater 218 alone is used to stabilize sensor 210 in thermal equilibrium.

Figure 7C:
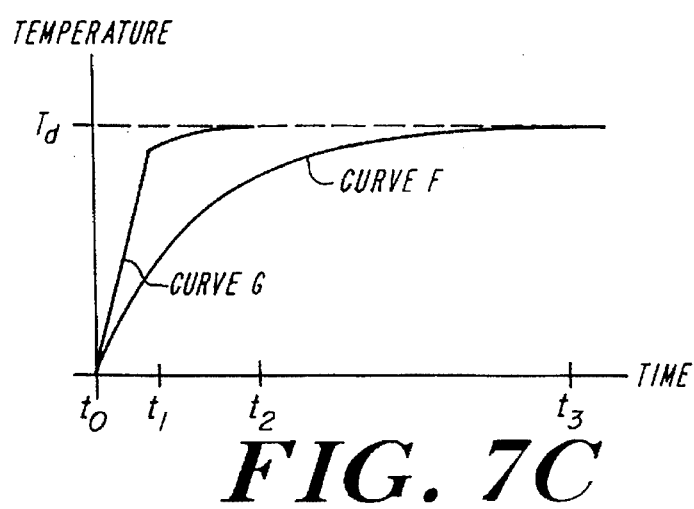

FIG. 7C shows two curves, curve F and curve G which illustrate the temperature of the sensor as a function of time during the warm up period of prior art transducer assembly 100 and transducer assembly 200, respectively. As stated above, prior art transducer assembly 100 is warmed up by heating thermal shell 116 to the desired operating temperature $T_d$ for as long as is required for the temperature of sensor 110 to climb from an initial temperature to the desired operating temperature $T_d$. As shown by curve F, if heater 118 is initially activated at initial time $t_0$ the temperature of sensor 110 gradually climbs until it reaches the desired operating temperature $T_d$ at a time $t_3$. So the warm up time for prior art transducer assembly 100 is the interval between $t_0$ and $t_3$. In transducer assembly 200, controller 220d activates auxiliary heater 260 between times $t_0$ and $t_1$ so as to apply a fixed amount of heat to sensor 210. As shown by curve G, in transducer assembly 200 the temperature of sensor 210 quickly approaches the desired operating temperature during the interval between $t_0$ and $t_1$ due to the additional heat provided by auxiliary heater 260. The power applied to auxiliary heater 260 may be supplied by an unregulated power source and even directly from a house power grid. At time $t_1$ controller 220d deactivates auxiliary heater 260 and thereafter controller 220b completes the warm up of sensor 210 by using heater 218 alone, so that between times $t_1$ and $t_2$ the temperature of sensor 210 converges to the desired operating temperature. So the warm up time of transducer assembly 200 is the interval between $t_0$ and $t_2$ and is considerably shorter than the warm up time of prior art transducer assembly 100.

This mode of operation in which control unit 220 activates auxiliary heater 260 for a fixed time and then disables auxiliary heater 260 thereafter is preferred because of its simplicity. However, in other preferred modes, controller 220d controls auxiliary heater 260 in response to a temperature measurement provided by thermistor 262 until the temperature of sensor 210 approaches a selected temperature. This selected temperature may be less than, or may even be equal to, the desired operating temperature of sensor 210. So controller 220d may activate auxiliary heater 260 during portions of the warm up period, or alternatively may activate auxiliary heater 260 during the entire warm up period, and even thereafter.

Figure 5A:
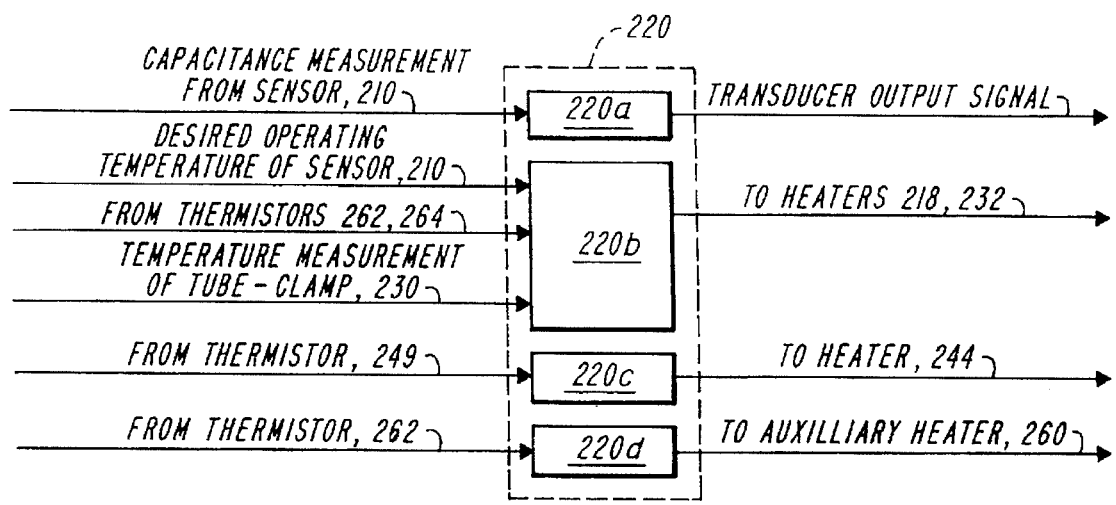
FIG. 5A shows a block diagram of a control unit used in the embodiment described with respect to FIG. 5.

The warm up time of transducer assembly 200 may be thought of as including a first portion during which the temperature of sensor 210 is quickly increased to a selected temperature near (or equal to) the desired operating temperature $T_d$ and a second portion during which the sensor 210 achieves thermal equilibrium at $T_d$. Auxiliary heater 260 shortens the first portion of the warm up time by rapidly heating sensor 210 to the selected temperature, and use of the two thermistors 262, 264, shortens the second portion of the warm up time by accelerating the heat transfer from thermal shell 216 to sensor 210 when the temperature of sensor 210 is converging to $T_d$. Transducer assembly 200 may be implemented using only auxiliary heater 260 (and not thermistor 264), or may be implemented using only thermistors 262,264 (and not auxiliary heater 260) and still provide a reduced warm up time. However, the preferred embodiment of transducer assembly 200 includes both auxiliary heater 260 and thermistor 264. In addition to auxiliary heater 260 and thermistors 262, 264, preferred embodiments of transducer assembly 200 further include tube-clamp 230 and tube-heater 232 (shown in FIG. 2A) as well as an integrally mounted control unit 220 and devices for controlling the temperature of control unit 220 independently from that of sensor 210 (such as in the vented embodiments shown in FIGS. 3–4 and a controller 220c shown in FIG. 5A for independently controlling the temperature of heater 244).

Since certain changes may be made in the above apparatus without departing from the scope of the invention herein involved, it is intended that all matter contained in the above description or shown in the accompanying drawing shall be interpreted in an illustrative and not a limiting sense.

What is claimed is:

1. A pressure transducer assembly comprising:

(A) an external enclosure defining an interior cavity;

(B) a pressure sensor, disposed in one portion of said interior cavity and including an input port for receiving a gas or vapor, for sensing the pressure of the gas or vapor at the input port as a function of a parameter value that varies according to the pressure of the gas or vapor at the input port;

(C) controller means, disposed in another portion of said interior cavity, for sensing the parameter value and for generating in response thereto an output signal representative of the pressure at said input port;

(D) first temperature control means for controlling the temperature of said sensor;

(E) second temperature control means for controlling the temperature of said controller means; and (F) thermal control means for controlling said first temperature control means to control the temperature of said sensor at a first preselected temperature, and for controlling said second temperature control means to control the temperature of said controller means at a second preselected temperature different from the first preselected temperature.

2. A pressure transducer assembly according to claim 1, further comprising a first thermal shell disposed within said external enclosure, said sensor being disposed within said first thermal shell.

3. A pressure transducer assembly according to claim 2, wherein said first temperature control means comprises a heater disposed proximal to said first thermal shell.

4. A pressure transducer assembly according to claim 3, further comprising a second thermal shell disposed within said external enclosure, at least a portion of said controller means being disposed within said second thermal shell.

5. A pressure transducer assembly according to claim 4, wherein said second temperature control means comprises a heater disposed proximal to said second thermal shell.

6. A pressure transducer assembly according to claim 1, said external enclosure including at least one aperture proximal to said controller means.

7. A pressure transducer assembly according to claim 1, further comprising a thermal shunt disposed within said external enclosure between said controller means and said sensor.

8. A pressure transducer assembly according to claim 1, wherein said external enclosure includes a first compartment and a second compartment, said sensor being disposed within said first compartment and said controller means being disposed within said second compartment, said assembly further including means for thermally isolating said first and second compartments.

9. A pressure transducer assembly according to claim 8, wherein said means for thermally isolating said first and second compartments includes a thermal shunt disposed therebetween.

10. A pressure transducer assembly according to claim 8, further including standoff means for fixing said first compartment relative to said second compartment.

11. A pressure transducer assembly according to claim 10, wherein said standoff means comprises thermally insulating material.

12. A pressure transducer assembly according to claim 8, said first compartment being spaced apart from said second compartment.

13. A pressure transducer assembly according to claim 1, said first temperature control means including means for maintaining said sensor substantially in thermal equilibrium at said first preselected temperture.

14. A pressure transducer assembly according to claim 1, said second temperature control means including means for maintaining at least a portion of said controller means substantially in thermal equilibrium at said second preselected temperature.

15. A pressure transducer assembly comprising:

(A) an enclosure defining an interior cavity;

(B) a first heater and a second heater;

(C) a pressure sensor, disposed in one portion of said interior cavity proximal to said first heater and including an input port for receiving a gas or vapor, for sensing the pressure of the gas or vapor at the input port as a function of a parameter value that varies according to the pressure of the gas or vapor at the input port; and (D) a control unit, disposed in another portion of said interior cavity proximal to said second heater, including signal conditioning means for sensing the parameter value and for generating in response thereto an output signal representative of the pressure at said input port and said control unit including thermal control means for controlling said first heater so as to control the temperature of said sensor at a first preselected temperature, and for controlling said second heater so as to control the temperature of said control unit at a second preselected temperature different from the first preselected temperature.

16. A pressure transducer assembly comprising:
(A) an external enclosure, including an aperture, for defining an interior cavity;
(B) a pressure sensor, disposed in said interior cavity and including an input port for receiving a gas or vapor, for sensing the pressure of the gas or vapor at the input port as a function of a parameter value that varies according to the pressure of the gas or vapor at the input port;
(C) a tube for defining a conduit for the vapor or gas to said input port of said sensor, said tube extending through said aperture and having a first end coupled to the input port of the sensor and a second end positioned outside the enclosure;
(D) first temperature control means for controlling the temperature of said sensor;
(E) second temperature control means for controlling the temperature of said tube, said second temperature control means including means, proximal to and in thermal contact with at least a portion of the section of the tube extending between said first end and said aperture, for providing heat transfer with said tube; and
(F) controller means for controlling said first and second temperature control means, said controller means being disposed within said interior cavity.

17. A pressure transducer assembly according to claim 16, wherein said means for providing heat transfer includes a tube-clamp clamped to said portion of said tube.

18. A pressure transducer assembly according to claim 17, wherein said second temperature control means further includes a tube-heater proximal to said tube-clamp for heating said tube-clamp.

19. A pressure transducer assembly according to claim 17, wherein said tube-clamp comprises thermally conductive material.

20. A pressure transducer assembly according to claim 17, wherein said external enclosure comprises a plate, and wherein said plate defines said aperture.

21. A pressure transducer assembly according to claim 20, further comprising fastening means for fastening said tube-clamp so as to be spaced apart from said plate.

22. A pressure transducer assembly according to claim 21, wherein said fastening means comprises thermally insulating material so as to thermally insulate said plate from said tube clamp.

23. A pressure transducer according to claim 21, wherein said fastening means fastens said tube-clamp relative to said plate such that there is a gap between said tube-clamp and said plate.

24. A pressure transducer assembly according to claim 21, wherein said tube-clamp includes a collar that extends through said aperture between said tube and said plate.

25. A pressure transducer assembly according to claim 24, wherein said aperture is larger than the collar so that there is a gap between said plate and said collar when said fastening means fastens said tube-clamp relative to said plate.

26. A pressure transducer assembly according to claim 20, said plate including a first region and a second region, said first region being disposed around and proximal to said aperture, said first region having a higher thermal resistance than said second region.

27. A pressure transducer assembly according to claim 20, said plate including a first region and a second region, said first region being disposed around and proximal to said aperture, said first region being thinner than said second region.

28. A pressure transducer assembly according to claim 17, wherein said tube-clamp includes a central aperture and wherein said tube extends through said central aperture of said tube-clamp.

29. A pressure transducer assembly according to claim 28, said tube-clamp including means for expanding and contracting said central aperture between an open position and a closed position, said tube being slidable through said tube-clamp when said central aperture is in said open position, and said tube-clamp clamping said tube when said central aperture is in said closed position.

30. A pressure transducer assembly comprising:
(A) an enclosure, including an aperture, for defining an interior cavity;
(B) a pressure sensor, disposed in said interior cavity and including an input port for receiving a gas or vapor, for sensing the pressure of the gas or vapor at the input port as a function of a parameter value that varies according to the pressure of the gas or vapor at the input port;
(C) a tube for defining a conduit for the vapor or gas to said input port of said sensor, said tube extending through said aperture and having a first end coupled to the input port of the sensor and a second end positioned outside the enclosure, said tube being smaller than said aperture so that there is a gap between said tube and said aperture and so that said tube does not contact said enclosure.

31. A pressure transducer assembly according to claim 30, further comprising insulation disposed around said tube, said insulation extending through said aperture.

32. A pressure transducer assembly comprising:
(A) an external enclosure defining an interior cavity;
(B) a thermal shell, disposed within said interior cavity, for defining a sensor cavity;
(c) a pressure sensor, disposed within said sensor cavity and including an input port for receiving a gas or vapor, for sensing the pressure of the gas or vapor at the input port as a function of a parameter value that varies according to the pressure of said gas or vapor at said input port;
(D) means for coupling pressurized gas or vapor to said input port;
(E) temperature control means for controlling the temperature of said thermal shell, said temperature control means including means disposed proximal to said thermal shell for providing heat transfer with said thermal shell; and
(F) auxiliary heater means disposed in said sensor cavity proximal to said sensor for heating said sensor.

33. A pressure transducer assembly according to claim 32, further comprising controller means for controlling said temperature control means and said auxiliary heater means.

34. A pressure transducer assembly according to claim 33, said controller means including means for sensing an initial power up condition of said transducer.

35. A pressure transducer assembly according to claim 34, wherein said controller means activates said auxiliary heater means for a first time interval following an initial power up condition of said transducer assembly.

36. A pressure transducer assembly according to claim 35, wherein said controller means controls said temperature control means so as to bring said sensor into thermal equilibrium at a desired operating temperature following said first time interval.

37. A pressure transducer assembly according to claim 34, further including temperature sensing means for sensing the temperature of said sensor.

38. A pressure transducer assembly according to claim 37, wherein said controller means includes means, responsive to said temperature sensing means, for activating said auxiliary heater means following an initial power up condition of said transducer assembly until the temperature of said sensor reaches a first preselected temperature.

39. A pressure transducer assembly comprising:

(A) an enclosure defining an interior cavity;

(B) a thermal shell, disposed within said interior cavity, for defining a sensor cavity;

(C) a pressure sensor, disposed in said sensor cavity and including an input port for receiving a gas or vapor, for sensing the pressure of the gas or vapor at the input port as a function of a parameter value that varies according to the pressure of the gas or vapor at said input port;

(D) means for coupling a source of said gas or vapor to said input port;

(E) first temperature sensitive means for measuring the temperature of said thermal shell;

(F) second temperature sensitive means for measuring the temperature of said sensor; and (G) controller means, responsive to said first and second temperature sensitive means, for controlling the temperature of said thermal shell as a function of the temperature of said thermal shell and the temperature of said sensor.

40. A pressure transducer assembly according to claim 39, wherein said first temperature sensitive means comprises a first thermistor, and wherein said second temperature sensitive means comprises a second thermistor.

41. A pressure transducer assembly according to claim 40, wherein said first and second thermistors are coupled together in series between said controller means and an electrical reference potential.

42. A pressure transducer assembly according to claim 41, said first thermistor being characterized by a first temperature coefficient and said second thermistor being characterized by a second temperature coefficient, said second temperature coefficient being larger than said first temperature coefficient.

43. A pressure tranducer assembly according to claim 39, said controller means comprising a heater disposed proximal to said thermal shell.

44. A pressure transducer assembly according to claim 39, wherein said first and second temperature sensitive means are selected from a group consisting of thermistors, resistance temperature devices, and thermocouples.

45. A pressure transducer assembly according to claim 39, wherein said controller means controls the temperature of said thermal shell so that an average of the temperatures of the thermal shell and the sensor is substantially equal to a desired operating temperature.

46. A pressure transducer assembly according to claim 39, wherein said controller means controls the temperature of said thermal shell so that a weighted average of the temperatures of the thermal shell and the sensor is substantially equal to a desired operating temperature.

47. A pressure transducer assembly comprising:

(A) an external enclosure defining an interior cavity;

(B) a pressure sensor, disposed in one portion of said interior cavity and including an input port for receiving a gas or vapor, for sensing the pressure of the gas or vapor at the input port as a function of a parameter value that varies according to the pressure of the gas or vapor at the input port;

(C) controller means, disposed in another portion of said interior cavity, for sensing the parameter value and for generating in response thereto an output signal representative of the pressure at said input port;

(D) first temperature control means for maintaining said sensor substantially in thermal equilibrium at a first preselected temperature; and (E) second temperature control means for maintaining at least a portion of said controller means substantially in thermal equilibrium at a second preselected temperature different from the first preselected temperature.

48. A pressure transducer assembly according to claim 47, said first temperature control means comprising a first thermal shell disposed within said external enclosure, said sensor being disposed within said first thermal shell.

49. A pressure transducer assembly according to claim 48, said first thermal shell comprising thermally conductive material.

50. A pressure transducer assembly according to claim 49, said first temperature control means comprising a first heater disposed proximal to said first thermal shell.

51. A pressure transducer assembly according to claim 50, said second temperature control means comprising a second thermal shell disposed within said external enclosure, said portion of said controller means being disposed within said second thermal shell.

52. A pressure transducer assembly according to claim 51, said second thermal shell comprising thermally conductive material.

53. A pressure transducer assembly according to claim 52, said second temperature control means comprising a second heater disposed proximal to said second thermal shell.

54. A pressure transducer assembly according to claim 53, said controller means including means for controlling said first and second heaters.

55. A pressure transducer assembly comprising:

(A) an external enclosure, including an aperture, for defining an interior cavity;

(B) a pressure sensor, disposed in said interior cavity and including an input port for receiving a gas or vapor, for sensing the pressure of the gas or vapor at the input port as a function of a parameter value that varies according to the pressure of the gas or vapor at the input port;

(C) a tube for defining a conduit for the vapor or gas to said input port of said sensor, said tube extending through said aperture and having a first end coupled to the input port of the sensor and a second end positioned outside the external enclosure;

(D) first temperature control means for controlling the temperature of said sensor;

(E) second temperature control means for controlling the temperature of said tube, said second temperature control means including means, proximal to and in thermal contact with at least a portion of the tube, for providing heat transfer with said tube; and (F) controller means for controlling said first and second temperature control means, said controller means being disposed within said interior cavity.

* * * * *